STABILIZED DELTA MODULATOR

Filed Dec. 27, 1971

Feb. 13, 1973 J. C. CANDY 3,716,803

STABILIZED DELTA MODULATOR

Filed Dec. 27, 1971 2 Sheets-Sheet 2

United States Patent Office 3,716,803
Patented Feb. 13, 1973

3,716,803

STABILIZED DELTA MODULATOR

James Charles Candy, Convent Station, N.J., assignor to Bell Telephone Laboratories, Incorporated, Murray Hill and Berkeley Heights, N.J.

Filed Dec. 27, 1971, Ser. No. 212,311
Int. Cl. H03k *13/22*
U.S. Cl. 332—11 D 5 Claims

ABSTRACT OF THE DISCLOSURE

In delta modulators, especially those known as adaptive delta modulators, numerous factors such as noise, delay, decision circuit hysteresis, and poor adaptive algorithms can result in instabilities in the form of low frequency, high amplitude oscillations.

Instabilities can be eliminated through means for producing an overshoot in the integrator output, and actuating the decision circuit while the overshoot is present.

BACKGROUND OF THE INVENTION

This invention relates to digital message transmission systems and, more particularly, to delta modulation systems.

In conventional delta modulation systems, an analog signal to be encoded and transmitted is periodically compared with the output of an integrator circuit which is controlled by the transmitted pulse signal. This transmitted pulse signal is a train of positive or negative pulses, or marks and spaces, occurring at a constant rate. These transmitted pulses are also fed back to the integrator to increase or decrease its output. In the comparison of the integrator output with the instantaneous sample of the input signal, a decision is made by a decision circuit as to whether or not a pulse is to be transmitted, based upon the sign of the difference of the compared signals. Ideally, the reconstructed signal, i.e., the integrator output, will oscillate at high frequency and low amplitude about the input signal value, with the decision circuit detecting alternate positive and negative differences.

Unfortunately, imperfections in circuit components, circuit delays, spurious coupling, noise and hysteresis in the decision circuit all tend to have a deleterious effect on the decision process. Because of these defects, faulty decisions are made, giving rise to low frequency, high amplitude oscillations and instabilities which produce overall degradation of the message transmission.

An additional factor contributing to such signal degradation occurs in adaptive delta modulation systems which are designed to reduce overload and quantizing noise. In such systems, the step size of the incremental voltage applied to the integrating capacitor is varied on the basis of the previous history of the signal comparisons. Where hysteresis is present in the decision making process, the algorithm for varying the step size can produce quite large voltage swings, thereby enhancing the undesirable oscillation effects. Also, a poor algorithm alone can cause instabilities.

In U.S. Pat. No. 3,550,004 of James C. Candy, which issued Dec. 22, 1970, there is shown a circuit arrangement for eliminating the low frequency oscillations which occur in adaptive delta modulation encoders. In the circuits disclosed in that patent, the step weighting circuit is removed from the feedback circuit and comprises two weighted step generators, the outputs of which are selectively applied to the subtraction or comparator circuit in accordance with the feedback signal.

SUMMARY OF THE INVENTION

The present invention is designed to eliminate low frequency oscillations resulting from adaptive algorithms, but also such oscillations which result from hysteresis in the decision process, which can arise from spurious coupling, delays or faulty components.

In a first illustrative embodiment of the invention, in an adaptive delta modulation system, the signal to be encoded and the integrator output are applied to a comparator circuit and a decision is made by a decision circuit as to whether a pulse or no pulse is to be transmitted. The transmitted pulse is fed back to a step size generator whose output is applied through a resistance to one side of the integrator capacitor. Connected between the other side of the integrator capacitor and ground is a parallel RC combination of a capacitor and a resistor.

In operation, the pulse from the step generator charges both the integrating capacitor and the RC capacitor. As a consequence, the charge on the two capacitors is greater than on the integrating capacitor alone thereby causing a greater than ordinary signal to be applied to the comparator. At the cessation of the pulse from the step pulse generator, the RC capacitor commences to discharge through the resistor, causing the signal sent to the comparator to decrease gradually. The RC time constant is chosen to be approximately one-half of a sample period, i.e., one-half the period between consecutive pulses from the pulse generator, and a clock circuit actuates the decision circuit after the cessation of the pulse from the pulse generator and just after the RC capacitor commences to discharge, that is, within approximately the first third of the discharge cycle. The net effect of the RC circuit is to produce an overshoot in the integrator output which places it outside the hysteresis limits, and the decision is made while the overshoot is still present. In this way, a correct decision is assured without an overall distortion of the reconstructed signal.

In a second illustrative embodiment of the invention, the output of the step size pulse generator is applied through a resistance to the input of a high gain amplifier. The amplifier is shunted by a feedback circuit from its output to its input which comprises an integrating capacitor in series with a parallel RC network. In operation, the amplifier output charges the two capacitors in the same manner as before, the total charge on the capacitors acting to maintain the amplifier input at a low level. As in the case of the first embodiment, the combination produces an overshoot in the signal applied to the comparator, and the decision is made after cessation of the step pulse generator output, but while the overshoot is present. At the receiver a similar integrator arrangement exists to insure a more accurate reconstruction of the signal.

In both embodiments of the invention, the integrator circuit produces an overshoot in the signal applied to the comparator, and the decision circuit is timed to make its decision while the overshoot is present.

BRIEF DESCRIPTION OF THE DRAWINGS

The various features of the present invention will be more readily apparent from the following detailed description, taken in conjunction with the drawings, in which:

In FIG. 1A there is shown an analog signal curve A and a reconstructed signal curve B for a typical adaptive delta modulator in the absence of hysteresis. It can be seen that the reconstructed signal oscillates about the analog input signal at a high frequency and low amplitude. It can be seen that the reconstructed signal steps upward or downward to correct any difference between itself and the input signal. As is typical in adaptive delta modulators, the step size increases when there is a continuous sequence of steps in the same direction. Adaptive delta modulators which function in the manner are numerous and well known in the art, obeying many different algorithms depending upon their particular function.

FIG. 1B demonstrates the behavior of the reconstructed signal in the presence of hysteresis as represented by the dashed lines C—C, and also a poor algorithm. With hysteresis present, the decision circuit tends to make the same decision as the immediately preceding one whenever the reconstructed signal lies within the dashed lines. It can be seen that such behavior results in a low frequency, high amplitude oscillation about the input signal which seriously degrades the system performance.

FIG. 2 is a block diagram of an adaptive delta modulator 11 embodying the principles of the present invention, which substantially eliminates the undesirable oscillations of the type depicted in FIG. 1B. Inasmuch as adaptive delta modulation systems are known in the art, in the interests of simplicity a detailed diagram of such an arrangement has not been shown. Further, for simplicity, the receiver circuit has not been shown, inasmuch as its principal constituents are the same as the signal reconstruction circuitry of the modulators.

Figure 1A:
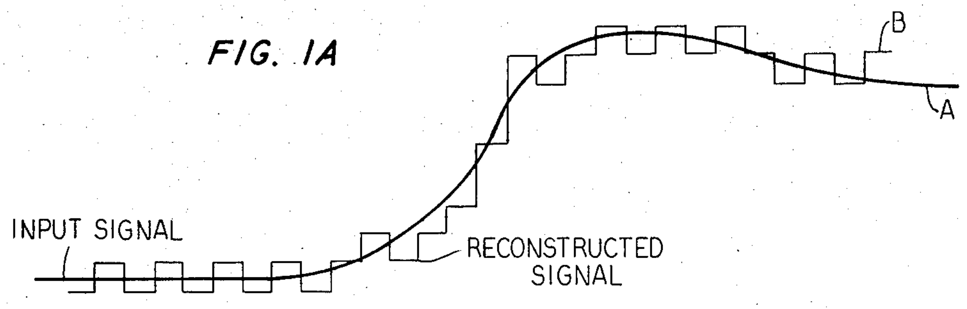
FIGS. 1A and 1B are curves indicating desirable and undesirable behavior, respectively, of a delta modulator.

Modulator 11 comprises a comparator 12 to which samples of an analog signal to be encoded are applied from a suitable source, not shown. As is common in delta modulators, the analog signal is periodically sampled at a high rate. The sampling circuit may take any of a number of forms, or it may even be incorporated into the comparator. The output of comparator 12 is applied to a decision ciruit 13 which generates single value pulses foı transmission to the receiver 23. The transmitted pulse train is fed back to a step size generator 14 which generates step pulses of varying magnitudes, depending upon the characteristics of the transmitted pulse train, as is typical of adaptive delta modulation systems. In such systems, a pulse is generated each sampling period whose magnitude is, generally, determined by the past history of the transmitted signal, in accordance with a particular algorithm.

The output of pulse generator 14 is applied to an integrator circuit 16 which comprises a series resistor 17 and a shunt capacitor 18. Connected in series between capacitor 18 and ground is a parallel combination of a capacitor 19 and a resistor 21. Capacitor 19 may be, and preferably is, of the same value as capacitor 18, and resistor 21 is so chosen that the RC time constant of the paralell circuit is approximately one-half of a sampling period. The output of integrator 16 is applied to comparator circuit 12 where it is compared with the analog input signal samples.

Figure 2:
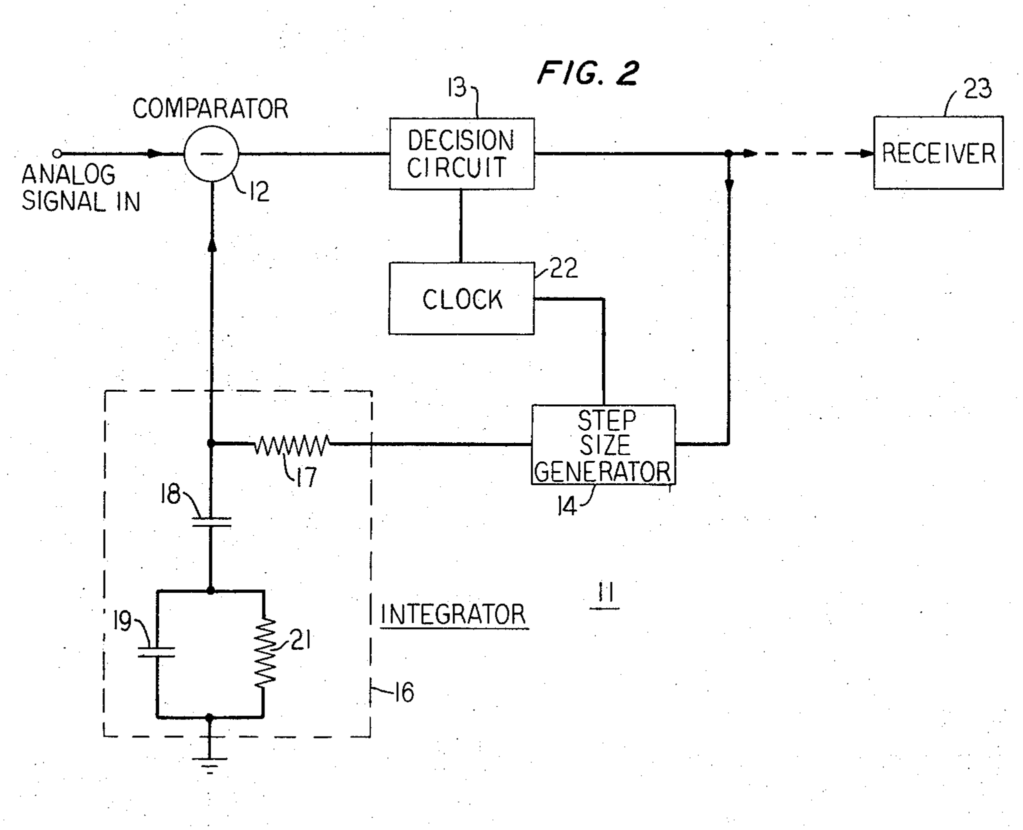
FIG. 2 is a block diagram of a delta modulator embodying the principles of the present invention.
Figure 3:
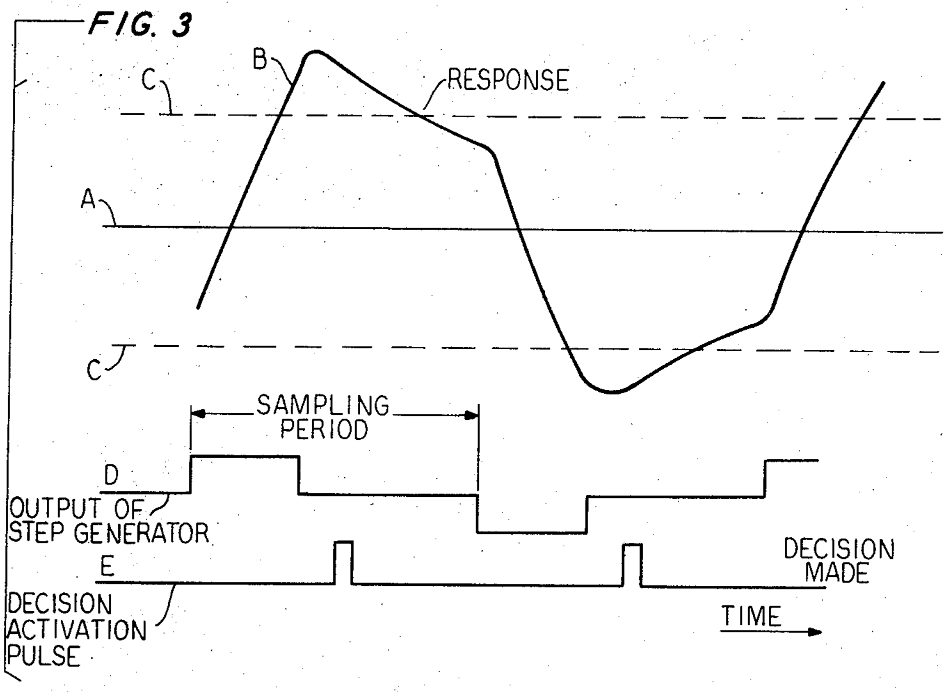
FIG. 3 is a series of curves to illustrate the operation of the circuit of FIG. 2.

The operation of the circuit of FIG. 2 can best be understood by reference to FIG. 3. In operation, the comparator 12 compares the input signal sample with the output of integrator 16 and produces an output indicative of their difference. Decision circuit 13, under control of a clock or timing circuit 22 decides, on the basis of the difference, whether to generate a pulse or no pulse. Thus, if the difference is positive, a pulse is generated and transmitted, and if the difference is negative, no pulse is transmitted. The output of the modulator is, therefore, a train of pulses and spaces. This pulse train is applied to the step generator 14 which, for example, produces a positive pulse if an output pulse is present and a negative pulse if no output pulse is present, as shown in curve D of FIG. 3. When a succession of pulses or space occurs, the generator 14 increases the magnitude of its output pulses. The number of successive pulses required to cause an increase in step size varies with the operating algorithm and forms no part of the present invention.

The pulse output of generator 14 is applied through resistor 17 to capacitors 18 and 19 which combined are charged to a voltage greater than the hysteresis limit, as shown by curve B in FIG. 3, which at its maximum exceeds curve C. Upon cessation of the pulse from generator 14, capacitor 19 commences to discharge through resistor 21. At this time, preferably immediately after the cessation of the pulse, but at least before the charge is reduced to the level represented by curve C, block 22 activates the decision circuit 13, which makes its decision during the duration of the activating pulse represented by curve E in FIG. 3. The curves of FIG. 3 are for illustrative purposes only; however, it can be seen that the decision must be made before the charge on the capacitors has intersected the hysteresis limit during the discharge cycle. In general, where the discharge time is approximately one-half a sampling period, as shown in FIG. 3, if the decision is made during the first third of the discharge cycle, the circuit will function as intended. As pointed out in the foregoing, it is preferable that the decision be made as close as possible to the cessation of the charging pulse and start of the discharge cycle.

Figure 1B:
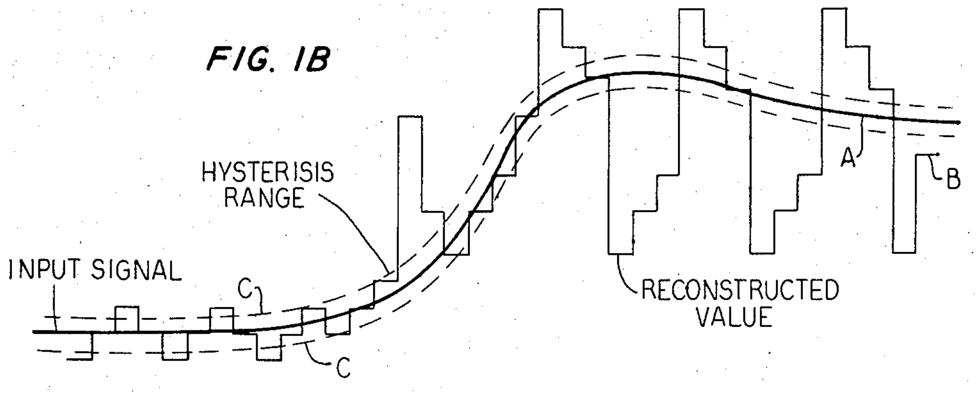
Figure 4:
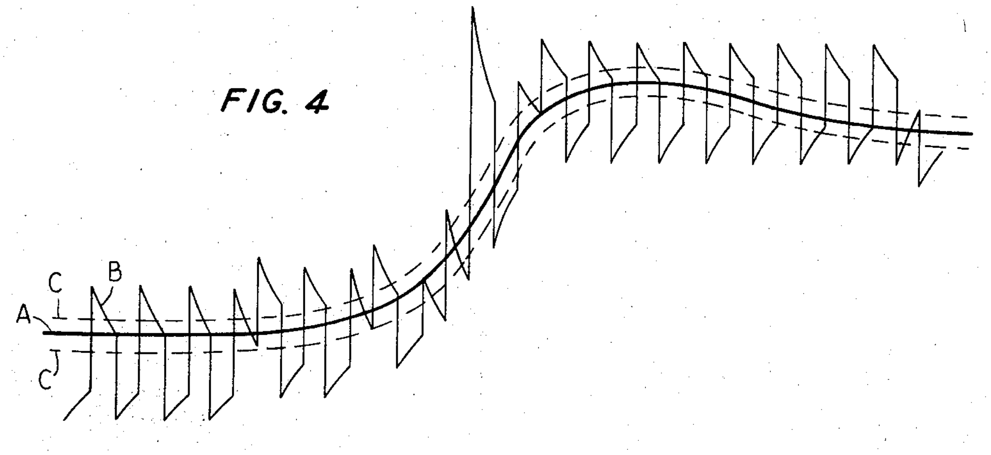
FIG. 4 shows curves which illustrate the behavior of the circuit of FIG. 2.

The curves of FIG. 4 illustrate the response of an adaptive delta modulator following the same algorithm as was illustrated in FIG. 1B, but utilizing the present invention as illustrated in FIG. 2. It can be seen that the reconstructed signal curve B oscillates at a high frequency about the input analog signal A. It can also be seen that the tendency of the circuit to produce high magnitudes is immediately corrected in the next succeeding sample period. The curves of FIG. 4 illustrate a much more stable circuit than the curves of FIG. 1B, which, of course, results from the utilization of the principles of the present invention.

Figure 5:
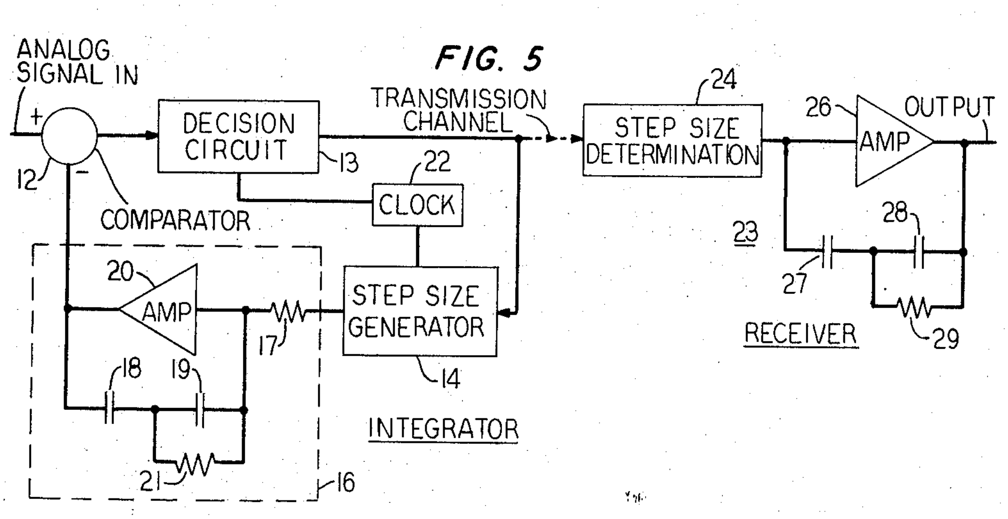
FIG. 5 is a block diagram of a second illustrative embodiment of the invention.

In FIG. 5 there is shown, in block diagram, a second illustrative embodiment of the invention. Inasmuch as the circuit of FIG. 5 is basically similar to that of FIG. 2, like elements have been designated by the same reference numerals. The circuit of FIG. 5 differs from that of FIG. 2 in the configuration of the integrator circuit 11, which comprises a resistor 17, a high gain amplifier 20 and a feedback circuit around the amplifier comprising an integrating capacitor 18 in series with a parallel RC network of a capacitor 19 and a resistor 21.

In operation, the output of amplifier 20 charges capacitors 18 and 19, producing a low net voltage at the amplifier input. When the pulse from pulse generator 14 ceases, capacitor 19 commences to discharge through resistor 21 as before. This has virtually no effect on the amplifier input, which is at substantially zero volts. On the other hand, any leakage from capacitor 18 is accompanied by a current input to the amplifier which then produces an output to correct the leakage. The net effect of the amplifier 20 is, therefore, to maintain the charge on capacitor 18 despite leakage and loading effects of comparator 12. This insures a truer value of charge on capacitor 18.

At the receiver 23, the same process is undergone, step pulse generator 24 and amplifier 26 charging capacitors 27 and 28 to produce a reconstructed signal that is a more accurate value due to the elimination of loading effects.

The foregoing has been for purposes of illustrating the principles of the present invention. Various modifications of the embodiments shown may occur to workers in the art without departure from the spirit and scope of the invention.

I claim:

1. In a delta modulation signal transmission system, an encoder for encoding periodically sampled analog signals into digital signals to be transmitted, said encoder comprising a comparator circuit to which the analog signal samples are applied, a decision circuit for generating and transmitting pulses based upon the comparator output, a feedback circuit connected to the output of said decision circuit for reconstructing an approximation of the analog signal and applying it to said comparator, said feedback circuit including a pulse generator for generating positive and negative pulses in response to the decision circuit output, an integrator circuit to which the output of said pulse generator is applied, said integrator circuit comprising first and second capacitors connected in series with each other, resistance means shunting said second capacitor and providing a discharge path therefor, the output of said integrator being connected to said comparator circuit, and means for actuating said decision circuit after cessation of a pulse from said pulse generator and during the time that said second capacitor is discharging through said resistance means.

2. An encoder as claimed in claim 1 wherein said last-mentioned means actuates said decision circuit within the first third of the discharge period of said second capacitor as determined by the RC time constant of said second capacitor and said resistance means.

3. An encoder as claimed in claim 1 wherein said integrator circuit further includes an amplifier connected in series with the output of said pulse generator, said first and second capacitors and said resistance means forming a feedback circuit from the output of said amplifier to the input thereof.

4. An encoder as claimed in claim 1 wherein said second capacitor and said resistance means form an RC circuit, said capacitor and said resistance means being so chosen that the RC time constant is approximately one-half of a sampling period.

5. In a delta modulation signal transmission system, an encoder for encoding periodically sampled analog signals into digital signals to be transmitted, said encoder comprising a comparator circuit to which the analog signal samples are applied and a decision circuit for generating and transmitting pulses in response to the comparator output, means for applying a reconstructed approximation of the analog signal to said comparator for comparison with said analog signal samples, said encoder being characterized by a range of values about the analog signal which causes said decision circuit to make erroneous decisions when the reconstructed signal falls within the range, and means for causing said reconstructed signal to exceed the range during the period that said decision circuit makes a decision, said last-mentioned means comprising an integrator circuit for reconstructing the signal, said integrator circuit comprising means for producing an overshoot in each reconstructed sample of the signal for a portion of the sampling period.

References Cited

UNITED STATES PATENTS

| | | | |
|---|---|---|---|
| 3,453,562 | 7/1969 | Magnuski | 325—38 BX |
| 3,550,004 | 12/1970 | Candy | 325—38 R |
| 3,624,558 | 11/1971 | Brolin | 332—11 D |
| 3,646,442 | 2/1972 | Kotch | 325—38 B |

ALFRED L. BRODY, Primary Examiner

U.S. Cl. X.R.

325—38 B